July 14, 1959     R. E. LOOMANS     2,894,663
FERTILIZER DISTRIBUTOR ATTACHMENT FOR GRAIN DRILLS
Filed July 22, 1957     2 Sheets-Sheet 1

INVENTOR.
ROBERT E. LOOMANS
BY
ATTORNEYS

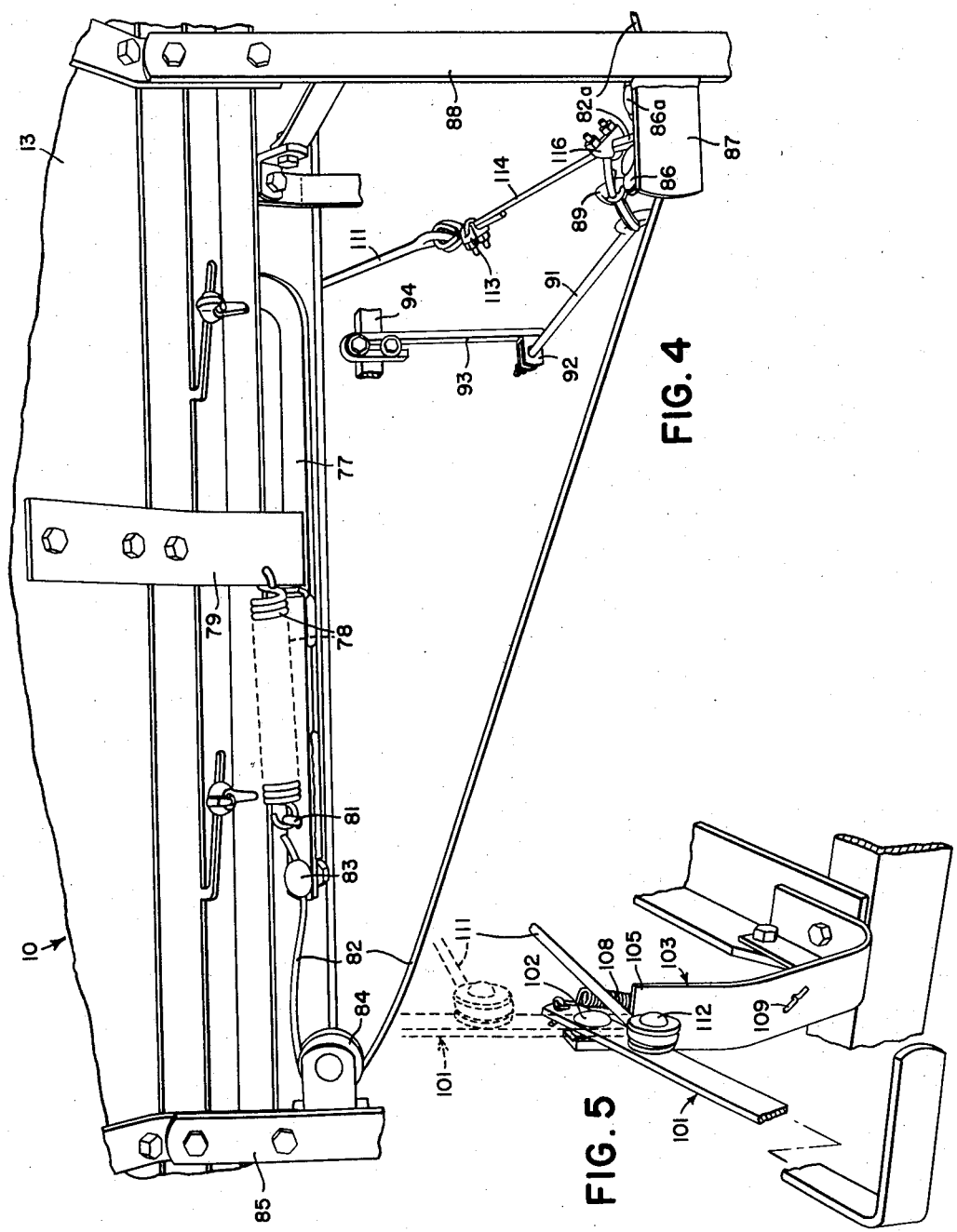

United States Patent Office 2,894,663
Patented July 14, 1959

2,894,663

FERTILIZER DISTRIBUTOR ATTACHMENT FOR GRAIN DRILLS

Robert E. Loomans, Horicon, Wis., assignor, by mesne assignments, to Deere & Company, a corporation of Delaware Application July 22, 1957, Serial No. 673,313

4 Claims. (Cl. 222—282)

This invention relates generally to agricultural implements and more particularly to grain drills, fertilizer distributors, and the like.

The object and general nature of this invention is the provision of a new and improved fertilizer attachment for grain drills, in which the attachment incorporates new and improved means for distributing fertilizer positively and accurately in the quantities desired. More specifically, it is a feature of the present invention to provide fertilizer distributing means in the nature of an elongated hopper having distributing openings in the bottom thereof and new and improved bearing means for supporting an associated rotary feed means insuring that the fertilizer will be distributed evenly and uniformly throughout the length of the hopper.

More specifically, it is a further feature of this invention to provide a fertilizer distributor having a readily removable agitator and feeding means, with associated means whereby the position of the rotary unit may be definitely and accurately secured and maintained, in order to have the feed shaft and associated parts in exactly the desired and/or necessary position relative to the bottom of the hopper to secure accurate and uniform distribution of the fertilizer.

Further, it is another feature of this invention to provide improved means for controlling the flow of fertilizer by the raising and lowering of the furrow opener operating rockshaft and by auxiliary means for controlling the material flow independently of the position of the rockshaft.

These and other objects and advantages of the present invention will be apparent to those skilled in the art after a consideration of the following detailed description, taken in conjunction with the accompanying drawings, in which the principles of this invention have been shown by way of illustration.

In the drawings:

Fig. 4 is a fragmentary perspective view of a portion of the shut-off slide control.

Fig. 5 is a fragmentary perspective view of a slide control hand lever and its mounting.

Figure 1:
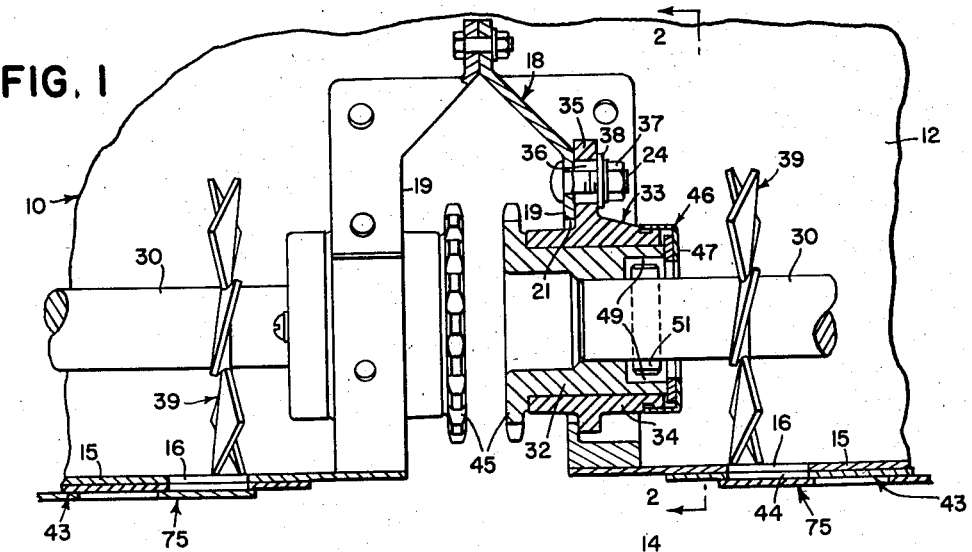
Fig. 1 is a vertical longitudinal sectional view taken through the central portion of the hopper of a fertilizer distributor in which the principles of this invention have been incorporated.
Figure 2:
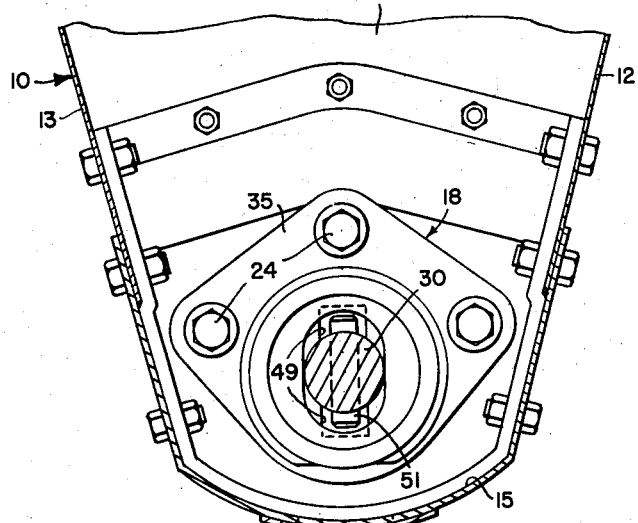
Fig. 2 is a section taken generally along the line 2—2 of Fig. 1.

The hopper of the fertilizer attachment of the present invention is indicated in its entirety by the reference numeral 10 and is adapted to be mounted by any suitable means at the rear side of the hopper of a more or less conventional grain drill. The hopper 10 comprises a transversely elongated container having a front wall 12, a rear wall 13, and end walls 14. The hopper 10 also includes a bottom wall 15 that is formed with a plurality of generally arcuate openings 16 through which fertilizer in the hopper 10 is distributed. Centrally, the hopper 10 is provided with a center drive housing 18 having a pair of vertical wall sections 19, each of which is provided with a fairly large aperture 21. Similarly, each end wall is provided with an aperture 22 that is substantially the same dimensionally, the apertures being arranged in axial alignment. Each center wall section 19 is provided with a plurality of bolts 24, or other suitable fasteners, the threaded ends of which extend inwardly through suitable openings in the wall section 19 around the aperture 21. Each end wall is similarly provided with a plurality of openings 26 through which threaded fasteners, such as bolts 27, extend laterally outwardly. A feed shaft 30 is disposed in the hopper 10 between the center drive housing 18 and each end of the hopper, the two feed shafts 30 being in axial alignment and disposed adjacent the bottom wall 15 of the hopper. The inner end of each feed shaft 30 is supported in a bearing hub 32 that has rotatable support in a bearing member 33. The latter includes a hub section 34 receiving the rotatable member 32 and a radially outwardly extending flanged portion 35 that is provided with a plurality of vertical slots 36, one for each of the fasteners 24. Each of the latter includes a nut 37 and a lock washer 38. The hub portion 34 is smaller than the aperture 21 so that the member 33 is capable of vertical adjustment relative to the drive housing 18. Each shaft 30 carries a plurality of feed wheels 39, one disposed generally in a position to enter each hopper bottom opening 16, and between the feed wheels 39, each shaft carries agitator elements 41. Disposed along the bottom wall 15 of the hopper is a flow control slide 43 that is provided with openings 44 registering with the hopper bottom openings 16. The slide 43 is adjustable longitudinally of the hopper for the purpose of exposing more or less of the openings 16 to the passage of fertilizer therethrough. At its laterally inner end, each bearing hub 32 is provided with a drive sprocket 45, and each bearing hub member 32 is held in position in the bearing support 33 by suitable sealing means 46, which may be of conventional construction. Preferably, however, such means includes a cap member 47 that has a press fit with the inner end of the hub portion 34 of the bearing member 33. This end of the bearing hub 32 is provided with a pair of diametrically opposed sockets 49 in which a drive pin 51 carried by the inner end of each shaft 30 is adapted to receive the drive from the sprocket section 45. The sockets 49 are open laterally outwardly so that the shaft 30 may be withdrawn laterally outwardly from the bearing hub 32 at any time. By loosening the nuts 37, the bearing support member 33 may then be adjusted toward or away from the hopper bottom so as to dispose the feed wheels in exactly the desired position relative to the hopper bottom. Preferably, the feed wheels are disposed to enter the opening 16 but not to extend downwardly therefrom, which would interfere with the operation of the flow controlling slide 43.

Figure 3:
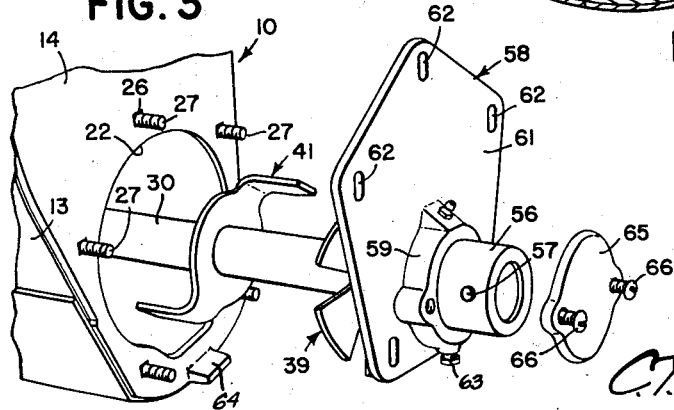
Fig. 3 is a fragmentary perspective view illustrating the manner in which the feed shaft and associated parts may readily be removed from the hopper.

At each outer end of the hopper, as best shown in Fig. 3, an exploded view, the means supporting the shaft is similar to that provided at the center drive housing. Specifically, a bearing bushing 56 is pinned, as at 57, to the outer end of each shaft 30 and is rotatably disposed within a bearing support member 58 that includes a hub section 59 and a flange section 61, the hub section 59 rotatably receiving the bearing bushing 56. The flange section 61 is provided with a plurality of vertical slots 62 that are spaced and dimensioned to fit over the fasteners 27 carried by the associated hopper end wall 14. Nuts and lock washers are carried on the outer threaded ends of the bolts 27, and by loosening the nuts, the outer bearing support member 58 may be adjusted vertically toward or away from the hopper bottom for the purpose of disposing the feed shaft and associated feed wheels in exactly the position desired relative to the hopper bottom. As best shown in Fig. 3, adjustable stop means in the form of a bolt or set screw 63 is threaded into a tapped opening in the lower portion of the hub section 59 and is adapted to engage a lug 64 on the lower portion of the end wall 14 to determine the adjusted position of bearing support, and the shaft and rotors carried thereby relative to the hopper bottom. A cap 65, fixed to the hub portion 59 of the bearing support member 58 by screws 66, closes the hub portion 59 to prevent the entrance of dust, dirt and the like.

Each shaft 30 with associated feed wheels and agitators may readily be removed from the hopper whenever it is desired to clean the latter, merely by removing the nuts from the bolts 27 and shifting the shaft at its associated outer bearing support 58 endwise away from the hopper, as is illustrated in Fig. 3. It will be noted from this figure that the apertures 22 in the end walls 14 are of ample diameter to permit the passage of the agitators and feed wheels outwardly from the hopper.

A shutoff slide 75 is mounted below the flow control slide 43 and is movable along the hopper bottom for opening and closing the hopper bottom openings whenever the grain drill is stopped. Many fertilizers in common use today flow quite freely, and if the grain drill is stopped with the flow control means 43 open, fertilizer will flow onto the ground, even though the feed wheels and agitators are not moving. The shutoff slide 75 is shiftable between open and closed position by means of a yoke 77 (Fig. 4) disposed at the rear of the hopper 10 and urged into open position by means of a spring 78 connected between a bracket 79 that forms a part of the hopper and one end of the yoke 77, the spring 78 being connected to the yoke 77 by means of a cotter 81. A controlling cable 82 is connected with the yoke for the purpose of moving it to closed position, and to this end one end of the cable is connected by a drilled bolt 83 to the yoke 77. The cable is trained over a sheave 84 supported on the adjacent part of the grain drill frame, such as the vertical brace 85, and from the sheave 84 the cable 82 extends over a sheave 86 supported on a bracket 87 carried by another portion of the frame, such as the bracket 88. The cable 82 then extends forwardly and is connected by a cable clamp 89 to the rear end of a rod 91, the forward end of which is slidably disposed in a swivel 92 carried at the lower end of a throw-out arm 93, the upper end of which is supported on the pressure shaft 94 that is connected, as by means not shown, to raise and lower the associated furrow openers. Thus, whenever the grain drill furrow openers are raised, the arm 93 is swung forwardly, and this exerts a pull through the cable 82 to pull the yoke 77 and the associated slide 75 into its shutoff position.

Another means is provided for also closing the shutoff slide 75. This means comprises a hand lever 101 mounted by a pivot 102 on the upper end of a bracket 103 carried by the forward portion of the grain drill frame. The bracket 103 preferably is in the form of an angle that is formed to have an upwardly facing shoulder 105 against which the hand lever 101 bears when it is swung forwardly and downwardly. A spring 108 is connected between the lower or rear end of the hand lever 101 and a cotter 109 carried by the bracket 103. A rod 111 is connected at its forward end, as by a pivot 112, to the hand lever 101. The rod 111 extends rearwardly and is connected by a cable clamp 113 to a cable 114 that is connected so as to serve as a part of the cable 82a for the shutoff slide (not shown) at the other side of the drill. The cable 82a is passed around a sheave 86a that is mounted on the bracket 87 adjacent the sheave 86. Any suitable means, such as a cable clamp 116, connects the cables 82 and 82a and the cable section 114, whereby the controlling arm 93 on the pressure shaft and/or the lever-actuated rod 111 serve to control both shutoff slides.

In operation, the shutoff slides are closed and opened by the operation of the pressure shaft in raising and lowering the associated furrow openers. If the grain drill should be stopped while the furrow openers are down, the controlling arm 93 will not close the shutoff slides. However, they may be closed by swinging the hand lever 101 downwardly from its upper position (dotted lines, Fig. 5) into an overcenter position, resting against the shoulder 105, as shown in full lines. This exerts a pull on the cables 82 and 82a through the rod 111 and thus closes the slides so that fertilizer will not flow from the hopper while the machine is standing in the field. For example, this may occur when the hoppers are being refilled. It is not necessary, when drilling is to be resumed, to manually release the hand lever 101. All that it is necessary to do is to momentarily raise the furrow openers, in which case the throw-out arm 93 exerts an additional pull on the cables 82 and 82a. This relieves the pull exerted on the rod 111 and the hand lever 101, whereupon the spring 108 swings the hand lever 101 upwardly from its overcenter lock position into a vertical position so that then as soon as the furrow openers are again lowered, the slides 75 are opened by the action of the springs 78 associated therewith.

While I have shown and described above the preferred structure in which the principles of the present invention have been incorporated, it is to be understood that my invention is not to be limited to the details shown and described above, but that, in fact, widely different means may be employed in the practice of the broader aspects of this invention.

What I claim, therefore, and desire to secure by Letters Patent is:

1. In a fertilizer distributor, a hopper having a center drive housing, an apertured end wall opposite said drive housing, the latter having a wall section provided with an enlarged opening, a bearing support member fixed in said enlarged opening, an inwardly disposed bearing means having a shaft-receiving socket, disposed rotatably in said bearing support member, means in said drive housing connected with said bearing means to drive the latter, a shaft carrying feed means, one end of said shaft being detachably disposed in said socket and the other end disposed in the aperture in said hopper wall, axially extending pin and slot means on said bearing means and said one end of said shaft whereby the latter is driven by rotation of said bearing means and said shaft is separable from said bearing means by axially outward movement relative thereto, said aperture being sufficiently large to permit the passage of both said shaft and said feed means out through said hopper end wall, a bearing member having a flange overlying said aperture and a journal portion receiving said other end of said shaft, and means detachably mounting said bearing member on the outer side of said hopper wall, said bearing mounting means including means providing for adjustment of said bearing member along said hopper end wall toward and away from the bottom of the hopper.

2. In a fertilizer distributor, an elongated hopper having a bottom wall and an end wall, the latter being apertured to provide an opening adjacent the bottom wall, a feed shaft removably disposed in said hopper and carrying feed means movable in close relation with the hopper bottom, inwardly disposed bearing means receiving the inner end of said shaft and adjustable toward and away from the hopper bottom, and an outer bearing means removably associated with said end wall and shiftable relative to the latter toward and away from the hopper bottom wall so as to adjust the position of said feed means relative to said bottom wall.

3. In a fertilizer distributor, a hopper comprising an elongated container having a hopper bottom, an apertured center drive housing and an apertured end wall, a shaft disposed in said hopper and having an end positioned adjacent the center and end apertures and a plurality of feed rotors fixed to the shaft to rotate with the latter in relatively close relation with the hopper bottoms, a plurality of threaded fasteners carried by said center housing and said end wall about the openings therein, a pair of bearing means rotatably receiving the ends of said feed shaft and each bearing means having a flange portion overlying the associated housing aperture or end wall aperture, each flange portion having vertically extending slots receiving said fasteners and providing for movement of said bearing means toward and away from the hopper bottom wall, and adjustable stop means acting between one of said bearing means and the associated end wall for determining the position of the shaft and feed rotors relative to the hopper bottom adjacent said end wall.

4. The invention set forth in claim 3, further characterized by said adjustable stop means including a lug fixed to said end wall immediately below the aperture therein, and a bolt threaded into the lower portion of the associated bearing means in a position such that the head of the bolt engages the associated lug.

References Cited in the file of this patent

UNITED STATES PATENTS

| | | |
|---|---|---|
| 2,526,609 | Masters | Oct. 17, 1950 |
| 2,626,729 | Ajero | Jan. 27, 1953 |
| 2,645,384 | Juzwiak et al. | July 14, 1953 |